April 20, 1965  L. G. ROESS  3,178,974
APPARATUS FOR WORKING ON A WORKPIECE WHILE MOVING
Filed April 2, 1962  2 Sheets-Sheet 1

INVENTOR.
LOUIS G. ROESS
BY
Popp and Sommer
ATTORNEYS

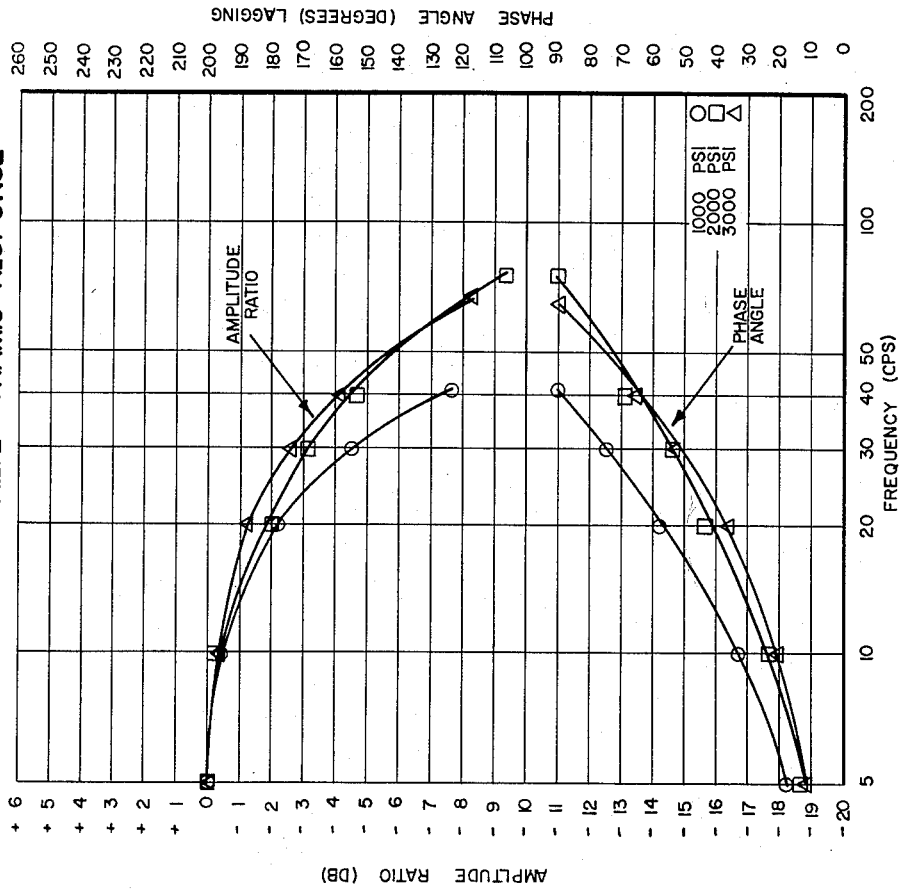
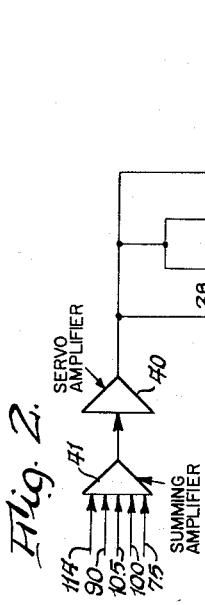

3,178,974
APPARATUS FOR WORKING ON A WORKPIECE
WHILE MOVING
Louis G. Roess, East Aurora, N.Y., assignor to Moog
Servocontrols Inc., East Aurora, N.Y., a corporation of
New York
Filed Apr. 2, 1962, Ser. No. 184,413
14 Claims. (Cl. 83—76)

This invention relates to improvements in apparatus for working on a workpiece while moving and more particularly to apparatus for cutting off predetermined lengths of a moving workpiece, sometimes known as a flying cut-off.

Apparatus is known for cutting off lengths of a workpiece while moving but difficulty has been encountered in producing the cut-off pieces with a uniform predetermined length. Variations in length of the cut-off pieces have necessitated trimming them, where exact lengths were desired, and this extra trimming operation involves wastage and added expense.

While others have heretofore attempted to provide apparatus which will cut off successive lengths of a moving workpiece, all of the same effective length to avoid the necessity of trimming with its attending disadvantages, none of the apparatus offered as solutions to this problem have been fully satisfactory or commercially acceptable.

It is the primary object of the present invention to provide apparatus for working on a workpiece while moving at predetermined longitudinally spaced intervals therealong which operates upon the workpiece accurately and at a high enough repetitive rate so as to be commercially acceptable. More specifically, the apparatus is employed for cutting off the workpiece into predetermined lengths which will not require further trimming.

Other objects and advantages of the present invention will be apparent from the following detailed description of a preferred embodiment illustrated in the drawings wherein:

FIG. 2 is a diagrammatic view of an electrohydraulic servovalve forming part of the apparatus shown in FIG. 1.

FIG. 3 is a plot of curves which graphically depict the minimum frequency response of a valve suitable for use in the inventive apparatus and of the type illustrated in FIG. 2.

Figure 1:
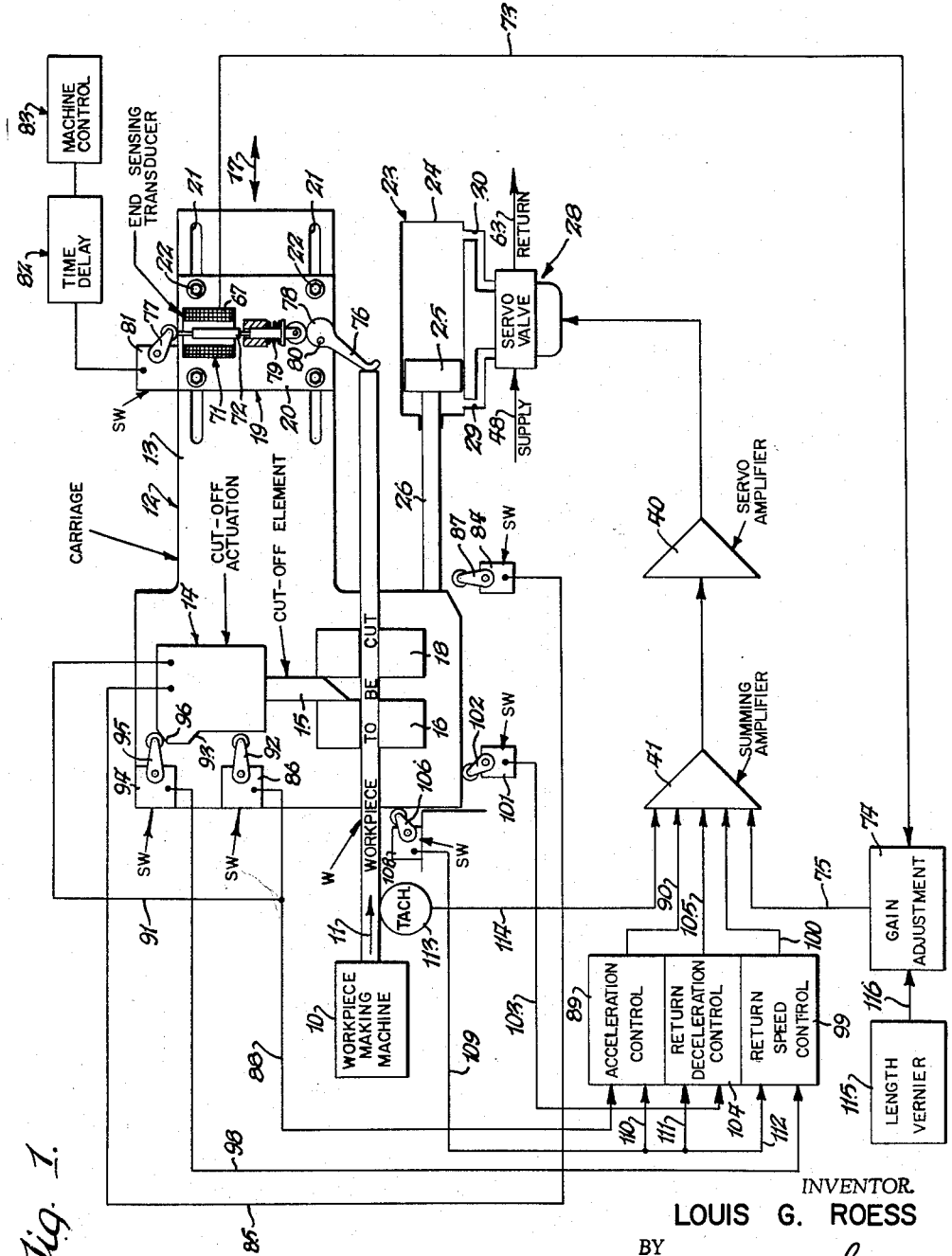
FIG. 1 is a diagrammatic view of apparatus for cutting off predetermined lengths of a moving workpiece and constructed in accordance with the principles of the present invention.

While the present invention in a broad sense is applicable to apparatus for performing any desired work on a workpiece while moving at predetermined intervals longitudinally thereof, the apparatus may be particularly advantageously employed for cutting off predetermined lengths of the moving workpiece and apparatus for such purpose is illustrated in FIG. 1. As there shown, the block 10 represents any suitable machine for making a workpiece W and movingly discharging the same at a variable or constant speed. While such machine may be of any suitable type to provide a continuous workpiece of the type desired, ultimately to be cut up into lengths, an example is a tube mill which forms and feeds continuous tubing to be cut into predetermined lengths.

The workpiece-making machine 10 is shown as discharging or feeding the workpiece W from left to right or in the direction of the arrow 11. The wokpiece is shown as being straight and moving rectilinearly over a cut-off head or carriage indicated generally at 12. This carriage 12 is suitably arranged to be reciprocably movable in parallelism to the workpiece W. As shown, the carriage 12 reciprocates in a direction represented by the double-headed arrow 17 which depicts a direction parallel to that represented by the arrow 11. The carriage 12 is diagrammatically shown as including a carriage plate 13 on which workpiece cut-off means, indicated generally at 14, are suitably mounted. The cut-off means include a movable cut-off element 15, specifically illustrated as a shear blade, arranged for movement transversely of the workpiece W by being slidable between guide blocks 16 and 18 also arranged on the carriage plate 13 and over which the workpiece W moves. When the cut-off means 14 are actuated, the cut-off element 15 which is shown in a retracted or inoperative position moves downwardly to an operative position to sever the workpiece W.

The carriage plate 13 is also shown as carrying end sensing transducer means indicated generally at 19. Such means comprise in part a support plate 20 adjustably mounted on the carriage plate 13. For this purpose, the plate 13 is shown as provided with a pair of spaced and parallel elongated slots 21 which are parallel to the direction of the arrow 17 and clamping bolts 22 extend through holes in the transducer support plate 20 and into the slots 21. By loosening the bolts 22, the transducer support plate 20 can be shifted where desired within the limits permitted by the slots 21 and thereafter fixed to the carriage plate 13 by tightening these bolts.

Means are provided for accelerating the carriage 12 from a starting position of rest which is shown in FIG. 1 to move this carriage and cut-off element 15 carried thereby in the same direction and at the same linear speed as the workpiece W. Such means are shown as including fluid-operated actuator means indicated generally at 23. These latter means more specifically are shown as including a cylinder 24 of the single-ended type in which a piston 25 is slidably arranged and a piston rod 26 extending outwardly through one end of the cylinder wall and suitably connected at one end to the piston 25 and at its other end to the carriage plate 13.

The aforementioned accelerating means also include electrohydraulic servovalve means indicated generally at 28 which are operatively associated via the conduits or lines 29 and 30 with the outer end portions of the cylinder 24 on opposite sides of the piston 25 therein.

Referring to FIG. 2, the electrohydraulic servovalve 28 is of the flow control type and comprises a polarized electrical force motor or torque motor indicated generally at 31, a first-stage hydraulic amplifier indicated generally at 32 and an output-stage valve spool of closed-center type indicated generally at 33.

The motor 31 is shown as comprising a pair of pole pieces 34 and 35 spaced apart to provide therebetween air gaps in which are movably arranged the ends of a rigid armature 36. Permanent magnets such as the one shown at 38 are operatively arranged between the pole pieces 34 and 35. Symmetrically surrounding the armature 36 are a pair of windings 39, 39 which are operatively associated with a servoamplifier 40 in turn operatively associated with a summing amplifier 41. The armature 36 is mounted on a flexure tube 42 which is adapted to bend to provide pivotal movement for the armature.

The hydraulic amplifier 32 is shown as comprising a rigid flapper 43 which is shown as extending downwardly from the central portion of the armature 36 and has a tip portion projecting between a pair of fixed, opposing and spaced apart nozzles 44 and 45. The nozzles 44 and 45 are shown as being suitably formed in a body member 46 on which the flexure tube 42 and motor 31 are suitably mounted. These nozzles are supplied with operating fluid such as hydraulic oil from any suitable source (not shown) via a supply conduit or line 48 which has first and second branch conduits or lines 49 and 50. The branch line 49 leads to the left nozzle 44 and has a restrictor 51 therein. The other branch line 50 leads to the other or right nozzle 45 and has a restrictor 52 therein.

The valve spool 33 is shown as having left and right end lobes 53 and 54, respectively, and a center lobe 55. This valve spool is slidably arranged in a cylindrical chamber 56 formed in the body member 46. The space between the left lobe 53 and the end wall of the chamber 56 communicates with the branch line 49 on the downstream side of the restrictor 51 via the branch conduit or line 58. A similar branch conduit or line 59 places the end portion of the chamber 56 to the right of the right spool lobe 54 in communication with the branch line 50 on the downstream side of the restrictor 52 therein.

The valve spool 33 is shown as being in its centered or null position. As there positioned, its left lobe 53 has an inner or right radial end face in substantial radial alinement with the laterally inner or right radial end face of a left pressure port 60 and the right lobe 54 of the valve spool has an inner or left radial end face in substantial alinement with the laterally inner or left radial end face of a right pressure port 61. The pressure ports 60 and 61 communicate with the branch line 50 on the upstream side of the restrictor 52 therein so as to place these ports under full supply pressure. The center lobe 55 of the valve spool has opposite radial end faces in substantial alinement with the corresponding opposing radial end faces of a return port 62 which communicates with a return conduit or line 63 leading to any suitable reservoir (not shown) for collecting drain fluid.

The return port 62 is also shown as being in communication with a sump chamber 64 into which the nozzles 44 and 45 discharge fluid. The space between the left lobe 53 and center lobe 55 communicates with a left actuating port 65 and the corresponding space between the center lobe 55 and the right lobe 54 communicates with a right actuating port 66. These actuating ports 65 and 66 communicate with the actuating lines 29 and 30, respectively, shown in FIG. 1.

Mechanical force feedback means are shown as operatively arranged between the valve spool 33 and the armature-flapper member 36, 43. For this purpose, the lower end of the flapper 43 is shown as connected to the upper end of a feedback spring wire 68 having an enlarged generally spherical head 69 at its lower end which is rollingly arranged against the walls of a groove 70 provided in the center lobe 55 of the valve spool.

Reverting to the end sensing transducer means 19 shown in FIG. 1, the same also include a linear variable differential transformer, indicated generally at 71, having windings 67 surrounding a rectilinearly movable element or slug 72. Relative movement between the slug 72 and the windings 67 produces an electrical signal proportional to such relative movement which is transmitted via the conductor 73 to gain adjustment means 74 from which an output conductor 75 leads to the summing amplifier 41.

The transducer means 19 also include a movable element 76 shown as an eccentrically mounted trip arm having a hub cam surface 78 on which a spring loaded follower 79 rides and this follower in turn is suitably connected to the slug 72. The trip arm swings about the axis of a pivot 80. It will be seen that counterclockwise movement of the trip arm 76 about its pivot 80, as viewed in FIG. 1, will cause the follower 79 to move upwardly to raise or push the slug 72 farther into the winding 67 and thereby generate an electrical signal transmitted by the conductor 73.

The upper end of the slug 72 is shown as having a stem adapted to engage the movable element 77 of a switch 81 which is operatively associated with time delay relay means, represented generally at 82, in turn operatively associated with machine control means, represented generally at 83, adapted to control activation and deactivation of the workpiece-making machine 10 as more fully explained hereinafter.

It will be noted that the trip arm 76 of the end sensing transducer means is adapted to be engaged by the leading end of the workpiece W and to be moved thereby and is arranged to generate an electrical control signal for the servovalve 28.

Means are provided for moving the cut-off element 15 from its retracted or inoperative position shown in FIG. 1 to its operative position in which it engages and severs the workpiece W, such means being operative after the cut-off head 12 has attained the same speed as the moving workpiece. Thus, the lack of relative movement between the workpiece and the cut-off element permits a clean cut to be made. This is achieved by providing a switch 84 having a movable element 87 adapted to be engaged by the carriage plate 13 after it has moved a predetermined distance away from its starting position. The switch 84 is suitably located so that its movable element 87 will be engaged by the carriage plate 13 after sufficient time has been allowed for the servovalve 28 to have been commanded and to respond to such command by accelerating the carriage plate 13 up to the same speed as the workpiece W. The switch 84 is shown as operatively associated with the cut-off means 14 by the conductor 85. Actuation of the switch 84 by the carriage plate 13 causes the cut-off means to move the cut-off element 15 downwardly to server the workpiece W and thereby cut off a length of the workpiece from the parent portion thereof. The cut-off means 14 may include any suitable means such as electrically operated valve and piston and cylinder means for effecting motion of the cut-off element 15.

Following serverance of the workpiece W, means are provided for accelerating the carriage 12 and hence the cut-off element 15 away from the leading end of the parent portion of the workpiece and such means are also arranged to return the cut-off element 15 to its inoperative or retracted position. Such means are shown as including a switch 86 and a conductor 88 operatively associating this switch with acceleration control means, represented generally at 89, and from which an output conductor 90 leads to the summing amplifier 41. A branch conductor 91 is shown as operatively associating the conductor 88 with the cut-off means 15. The switch 86 is shown as having a movable element 92 adapted to be engaged and moved by a cam 93 formed on a portion of the cut-off means 14 which moves with the element 15. It will be seen that downward movement of the cam 93 will cause engagement with the movable element 92 of the switch 86 to trip the same and thereby operatively control the cut-off means 14 and also the acceleration control means 89. Such control of the cut-off means 14 will be operative to retract the cut-off element 15. Actuation of the acceleration control means 89 causes an electrical signal to be fed via the conductor 90 ultimately to the motor of the servovalve 28 causing this valve to increase a flow of operating fluid with respect to the actuator 23 and thereby accelerate the cut-off head 12.

Means are provided which are operative upon return of the cut-off element 15 to its retracted or inoperative position for returning the carriage 12 to its starting position shown. Such means are shown as comprising a switch 94 having a movable element 95 adapted to be engaged by a cam surface 96 on a part of the cut-off means 14 which moves with the element 15. The switch 94 via a conductor 98 is operatively associated with return speed control means represented generally at 99. An output line 100 from the means 99 leads to the summing amplifier 41. The function of the return speed control means 99 is to reverse the polarity of the electrical control signal being fed to the motor of the servovalve 28. This operates to reverse the connections of the actuating lines 29 and 30 to pressure and drain ports in the valve as more fully explained hereinafter.

Means are provided for decelerating return of the carriage 12 to its starting position during the terminal portion of its return travel. Such means are shown as including a switch 101 having a movable element 102 adapted to engage and disengage the carriage plate 13. When this plate is in its starting position as shown in FIG. 1, the switch element 102 will be in the position illustrated. However, after a predetermined amount of rightward travel of the carriage plate 13, it will disengage the switch element 102 and move to a position in which it can be reengaged by the carriage plate when the latter returns in a leftward direction. This switch 101 is shown as being operatively associated via the conductor 103 with return deceleration control means indicated generally at 104. These means 104 have an outlet conductor 105 leading to the summing amplifier 41. The function of the return deceleration control means 104 is to reduce the magnitude of the electrical control signal input to the servovalve 28 during the terminal portion of return travel of the carriage 12, effective after the carriage trips the element 102 to actuate the switch 101. This operates to slow down the final portion of the return travel of the carriage.

As the carriage 12 returns to its starting position, it engages the movable element 106 of a reset switch 108 which is operatively associated via a conductor 109 and branch conductors 110, 111 and 112 with the acceleration control means 89, the return deceleration control means 104 and the return speed control means 99, respectively. The function of the reset switch 108 is to reset the various means 89, 104 and 99 for a new cycle of operation.

It is also desirable to provide means for sensing the linear speed of the moving workpiece W and to convert the sensed speed into an electrical signal. Such means may be of any suitable construction and are shown as including tachometer means 113 operatively associated with the moving workpiece W and via a conductor 114 adapted to feed an electrical signal into the summing amplifier 41. The function of the tachometer means 113 is to provide an electrical signal which is proportional to the linear speed of the moving workpiece so as to compensate for variation in such speed insofar as actuation of the carriage 12 is concerned.

Reverting to the gain adjustment means 74, the function of such means is to produce an output electrical signal changed in proportion to input electrical signal received from the transducer means 19 via the conductor 73, the gain ratio being predetermined and the gain representing the linear speed of the workpiece per unit displacement error of the transducer trip arm 76. Length vernier means 115 are arranged to feed an electrical signal via a conductor 116 into the gain adjustment means 74 for changing the level of magnitude of the output signal fed through conductor 75. By adjusting the magnitude of the signal in conductor 116, the set position of the trip arm 76 of the end sensing transducer means 19 is effectively adjusted and this, inturn, finely adjusts the effective length of the portion of the workpiece to be cut off. Any coarse adjustments in such length are provided by adjusting the transducer support plate 20 relative to the carriage plate 13, this being achieved by loosening the fasteners 22 and shifting the plate 20 longitudinally of the slots 21.

*Operation*

An understanding of the operation of the apparatus described entails an understanding of the operation of the electrohydraulic flow control servovalve 28. Operating fluid under supply pressure entering the line 48 is available at the pressure ports 60 and 61. Because the valve spool 33 is of the closed center type, the end lobes 53 and 54 close off the pressure ports 60 and 61, respectively, and the center lobe 55 closes off the return port 62, when the valve spool 33 is in its centered or null position. The actuating ports 65 and 66 are thus blocked from communicating either with the pressure ports 60 and 61 or the return port 62. Hence there is no flow through the actuating lines 29 and 30 with respect to the chambers of the actuator cylinder 24 on opposite sides of the actuator piston 25. However, any slight displacement of the valve spool 33 either to the right or left of null position will immediately couple the actuating ports 65 and 66 alternatively to the drain port 62 and one of the pressure ports 60 and 61 and cause flow with respect to the actuator 23, thereby resulting in a high pressure gain and movement of the carriage 12.

Fluid from supply line 48 supplies the nozzles 44 and 45 which jointly with the flapper 43 provide variable area annular orifices. Pivotal movement of the armature-flapper member 36, 43, which is electromagnetically induced by an electrical input to motor 31, causes the flapper 43 to move closer to one of the nozzles 44 and 45, depending upon the polarity of such input, and correspondingly farther away from the other nozzle. This develops a pressure differential in the spool end chambers to drive hydraulically the valve spool 33 which will displace until the electrically induced torque on the armature-flapper member 36, 43 is counterbalanced by the torque created by the mechanical force feedback from the valve spool due to bending of the feedback spring wire 68. Thus, the valve spool displacement is proportionate to electrical input. As previously noted, displacement from null position of the valve spool 33 will control the actuation of the fluid operated actuator 23 which moves the carriage 12.

For a more detailed description of the construction and explanation of the operation of such an electrohydraulic flow control servovalve with mechanical force beedback, reference is made to United States Patent No. 3,023,782.

Let it now be assumed that the cutting element 15 is in the retracted position shown in FIG. 1 and that the workpiece-making machine 10 is feeding the workpiece W from left to right at a substantially constant linear speed. The leading end of the moving workpiece engages the trip arm 76 and rotates this in a counterclockwise direction about its pivot 80. This raises the follower 79 and, in turn, the slug 72 of the end sensing transducer means 19. As a consequence, an electrical control signal is generated by the linear variable differential transformer 71 and this signal is fed via the conductor 73 to the gain adjustment means 74. There, at a predetermined ratio, the electrical signal fed by the conductor 73 is changed in magnitude.

It is assumed that the support plate 20 of the end sensing transducer means 19 has been previously adjusted relative to the carriage plate 13 for a coarse determination of the effective length of the portion of the workpiece to be cut off and also that any fine or vernier adjustment in such length has been made by adjustment of the length vernier means 115. This latter means operates to adjust the level of the magnitude of the output electrical signal fed by conductor 75 into the summing amplifier 41 from which the net output is fed to the servo amplifier 40.

A net electrical signal is fed from the summing amplifier 41 into the servo amplifier 40 where it is amplified and fed into the electrical force motor 31 of the servovalve 28. The polarity of the electrical signal input is such that the motor coils 39 are energized to induce electromagnetically the armature-flapper member 36, 43 to pivot in a counterclockwise direction as viewed in FIG. 2. Thus, the flapper 43 moves closer to the right nozzle 45 and correspondingly farther away from the left nozzle 44 to develop a pressure differential such that the higher pressure is present in the right spool end chamber and the lower pressure in the left spool end chamber. The valve spool 33 is displaced to the left uncovering left pressure port 60 which immediately communicates with left actuating port 65 and return port 62 is also uncovered for immediate communication with right actuating port 66. This allows fluid under supply pressure to flow into actuator cylinder 24 to the left of piston 25 and fluid on the right side of this piston to flow out of the cylinder to drain. As a consequence, the piston is hydraulically driven to the right and thereby moves the carriage 12 to the right.

Since the carriage 12 is at a rest position when the trip arm 76 is first contacted, this trip arm will continue to be rotated by the advancing workpiece W which has the effect of constantly increasing the strength or magnitude of the electrical signal input to the servovalve. Increase of this signal input causes a proportionately increased displacement leftward of the valve spool 33 thereby accelerating rightward movement of the actuator piston 25. Relative movement of the slug 72 and the windings 67 of the linear variable differential transformer 71 will produce an electrical signal in proportion to the displacement of the trip arm 76. As the carriage 12 accelerates, counterclockwise rotation of the trip arm 76 will gradually decrease until it ceases at which time the electrical control signal generated by the end sensing transducer means 19 will be constant, thereby indicating that the carriage 12 has attained the same linear speed as the moving workpiece W.

Should any variations in the linear speed of the workpiece W occur, this is picked up by the tachometer means 113 which will generate an electrical signal fed into the summing amplifier 41 via the conductor 114, which signal will be proportionate to the variation in linear speed of the workpiece. Any clockwise relation of the trip arm 76 relative to the workpiece, as may be occasioned by a decrease in the feed speed of the workpiece, reduces proportionately the magnitude of the electrical signal generated by and fed back from the end transducer means 19. The error signal fed into the servovalve will be the sum of the signals fed into the summing amplifier via the conductors 75 and 114. Thus the carriage 12 is controlled to move not only in the same direction and at the same speed as the workpiece but is moved into and maintained in a predetermined position relative to the workpiece without any mechanical connection therebetween or mechanical affixation of one to the other so that the carriage and workpiece are drivingly unconnected. Therefore the carriage can be said cyclically to have predetermined positional synchronization with respect to the continuously moving workpiece achieved by position information feedback.

After the carriage 12 has been accelerated to the same linear speed as the moving workpiece W in predetermined positional synchronization therewith, the carriage plate 13 will trip the movable element 87 of the switch 84 and this will operate the cut-off means 14 to cause the cut-off element 15 to move downwardly and sever the workpiece. The cut-off element 15 will continue to move until the cam 93 engages the movable element 92 of the switch 86 thereby actuating such switch. This operates via the conductors 88 and 91 to cause the cut-off means 14 to return the cut-off element 15 to its retracted position and at the same time to actuate the acceleration control means 89 which will increase the magnitude of the net electrical signal while maintaining the same polarity fed to the servovalve. Increasing this electrical signal causes a proportionately increased leftward displacement of the valve spool 33, resulting in rightward acceleration of the carriage 12 to separate the cut-off element 15 from the leading end of the parent portion of the workpiece W. The cut-off length will be suitably discharged so as to effect disengagement between it and the trip arm 76 allowing the latter to return to its starting position shown in FIG. 1. Return of the trip arm may be achieved in any suitable manner as by the spring of the follower 79.

As the carriage 12 moves to the right, the movable element 102 of switch 101 will be disengaged by the carriage plate 13. Return of the cut-off element 15 to its retracted or inoperative position will cause the cam 96 to engage the movable element 95 of the switch 94. Actuation of this switch via the conductor 98 causes actuation of the return speed control means 99 which produces an output electrical signal transmitted to the summing amplifier 41 via the conductor 100. This output electrical signal will be of the opposite polarity to that originally fed to the motor 31 of the servovalve. This will cause the armature-flapper member 36, 43 to pivot in a clockwise direction as viewed in FIG. 2, thereby moving the flapper 43 closer to the left nozzle 44 and correspondingly farther away from the right nozzle 45. This produces a pressure differential on the spool 33 with the predominant pressure against the left end thereof to shift the spool to the right. This connects right pressure port 61 with right actuating port 66 and return port 62 with left actuating port 65. This causes fluid under supply pressure to enter cylinder 24 via line 30 and bear against the right end face of the actuator piston 25 driving the same leftward. The fluid to the left of the actuator piston is drained via line 29.

As the carriage 12 moves leftward toward its starting position, the carriage plate 13 engages the movable element 102 of the switch 101. This, via the conductor 103, energizes the return deceleration control means 104 which operates to reduce the magnitude of the net electrical signal while maintaining its polarity being fed to the servovalve. The effect of this is to reduce the extent of rightward displacement of the valve spool 33, thereby slowing down the hydraulic drive on the actuator piston 25.

Ultimately, the returning carriage 12 engages the movable element 106 of the reset switch 108 which via conductors 109–112 will reset the various means 89, 104 and 99 for the next cycle.

Returning to the forepart of the cycle of operation described, when the trip arm 76 is first begun to be pivoted, movement of the slug 72 will cause the movable element 77 of the switch 81 to actuate this switch and thereby energize the time delay relay means 82. If the movable element 77 does not return to its starting position before the time delay means times out, the machine control means 83 will be actuated and it, in turn, will deactivate the workpiece-making machine 10. This situation might occur by a jam in the feeding of the workpiece W. Thus, the workpiece-making machine 10 will be shut down until the trouble is cleared up so that the cyclic operation of the trip arm 76 can occur within the time interval set by the time delay relay means 82.

There are two important features of the inventive apparatus. One feature is the close coupling of the actuating ports 65 and 66 of the servovalve 28 to the end portions of the cylinder 24 of the actuator means 23. Such close coupling, as previously indicated, is by means of the actuating lines 29 and 30. Keeping these lines short minimizes compliance of the various fluid conduits and renders the handling of fluid, particularly that under pressure, more effective in producing prompt response of the actuator piston 25 to fluid controlled by the valve spool 33 of the servovalve 28.

The second feature is the dynamic frequency response characteristics of the electrohydraulic servovalve 28. These characteristics, insofar as their minimal values are concerned, are depicted graphically in the curves forming FIG. 3. There are two sets of curves, three in each set, one set for phase angle and the other set for amplitude ratio. In both cases, the abscissa is the frequency in cycles per second and represents a sinusoidal variation of the electrical input signal from peak to peak of at least one-third rated signal. The left ordinate is calibrated for amplitude ratio in decibels and the right ordinate is calibrated for phase angle in degrees lagging. Three curves in each set are illustrated, the plot points surrounded by a circle representing a supply pressure for the servovalve of 1000 pounds per square inch, the plot points surrounded by a square representing a supply pressure of 2000 pounds per square inch and the plot points surrounded by a triangle representing a supply pressure of 3000 pounds per square inch.

It will be seen that as the frequency increases, the amplitude ratio droops. This is an indication of the frequency response of the servovalve as well understood by those skilled in the art.

It will also be seen that as the frequency increases, the phase lag increases which is also an indication to those skilled in the art of the frequency response of the servovalve.

For a servovalve suitable for the inventive apparatus, the 90° phase lag must occur at at least 40 cycles per second when the servovalve is supplied with operating fluid having a pressure of at least 1000 pounds per square inch and subjected to a sinusoidal input signal of at least one-third rated signal. Rated signal typically may be 15 milliamperes so that one-third of such signal would be 5 milliamperes. For the plots shown in FIG. 3, the flow through the actuating ports 65 and 66 is subjected to zero load.

Typically, the frequency response characteristics of the servovalve 28 are such that the valve spool 33 thereof can move from its centered or null position to a fully open position in the order of three milliseconds and is capable of reacting to an electrical signal input change occurring at say one hundred cycles per second.

As an example of the rapid operation of the apparatus, the carriage 12 can have a stroke of twenty inches with the linear speed of the moving workpiece being about three hundred feet per minute. While it is generally desired to keep the stroke as small as reasonably possible, if a particular application allows a longer stroke, the servovalve 28 can be located physically more remote from the actuator means 23.

From the foregoing, it will be seen that the present invention accomplishes the main objective stated. Construction of the details of the various means not specifically discussed will be apparent to those skilled in the art and any suitable means for performing the functions recited may be employed. Instead of the cut-off element 15 being a shear as illustrated, such element may be a saw, a torch or other suitable tool for severing the workpiece or performing the desired machining operation thereon. The invention is not intended to be limited by the specific embodiment illustrated but rather is to be determined as to scope by the appended claims.

What is claimed is:

1. In apparatus for cutting off a predetermined length of a workpiece while moving, the combination comprising a carriage movable in the same direction as the workpiece, cut-off means on said carriage and including a cut-off element movable from an inoperative position in which it is disengaged from the workpiece to an operative position in which it engages the workpiece, means for accelerating said carriage to move said cut-off element at the same speed as the workpiece in predetermined positional synchronization therewith including fluid operated actuator means for moving said carriage, electrohydraulic servovalve means having a closed center valve spool controlling the flow of operating fluid with respect to said actuator means and end sensing transducer means including a movable element adapted to engage the leading end of the workpiece and be moved thereby and arranged to generate a variable electrical control signal for the servovalve having a magnitude proportional to displacement of said movable element, means for moving said cut-off element from its said inoperative position to its said operative position after it has attained said same speed and positional synchronization thereby to cut off a predetermined length of the workpiece from the parent portion thereof, and means arranged thereafter to feed an increased electrical signal to the servovalve thereby to accelerate said cut-off element away from the leading end of said parent portion of the workpiece.

2. In apparatus for cutting off a predetermined length of a workpiece while moving, the combination comprising a carriage movable in the same direction as the workpiece, cut-off means on said carriage and including a cut-off element movable from an inoperative position in which it is disengaged from the workpiece to an operative position in which it engages the workpiece, means for accelerating said carriage to move said cut-off element at the same speed as the workpiece in predetermined positional synchronization therewith including fluid operated actuator means for moving said carriage, electrohydraulic servovalve means having a closed center valve spool controlling the flow of operating fluid with respect to said actuator means and end sensing transducer means including a movable element adapted to engage the leading end of the workpiece and be moved thereby and arranged to generate a variable electrical control signal for the servovalve having a magnitude proportional to displacement of said movable element, means for moving said cut-off element from its said inoperative position to its said operative position after it has attained said same speed and positional synchronization thereby to cut off a predetermined length of the workpiece from the parent portion thereof, and means arranged thereafter to feed an increased electrical signal to the servovalve thereby to accelerate said cut-off element away from the leading end of said parent portion of the workpiece and also arranged to return said cut-off element to its said inoperative position.

3. In apparatus for cutting off a predetermined length of a workpiece while moving, the combination comprising a carriage movable in the same direction as the workpiece from a starting position, cut-off means on said carriage and including a cut-off element movable from an inoperative position in which it is disengaged from the workpiece to an operative position in which it engages the workpiece, means for accelerating said carriage to move said cut-off element at the same speed as the workpiece in predetermined positional synchronization therewith including fluid operated actuator means for moving said carriage, electrohydraulic servovalve means having a closed center valve spool controlling the flow of operating fluid with respect to said actuator means and end sensing transducer means including a movable element adapted to engage the leading end of the workpiece and be moved thereby and arranged to generate a variable electrical control signal for the servovalve having a magnitude proportional to displacement of said movable element, means for moving said cut-off element from its said inoperative position to its said operative position after it has attained said same speed and positional synchronization including a first switch engaged by said carriage after the latter has moved a predetermined distance away from said starting position thereby to cut off a predetermined length of the workpiece from the parent portion thereof, and means arranged thereafter to accelerate said cut-off element away from the leading end of said parent portion of the workpiece and also arranged to return said cut-off element to its said inoperative position including a second switch operatively associated with acceleration control means and also operatively associated with said cut-off means.

4. In apparatus for cutting off predetermined lengths of a workpiece while moving, the combination comprising a carriage reciprocably movable in parallelism to the workpiece, cut-off means on said carriage and including a cut-off element movable from an inoperative position in which it is disengaged from the workpiece to an operative position in which it engages the workpiece, means for accelerating said carriage to move said cut-off element in the same direction and at the same speed as the workpiece in predetermined positional synchronization therewith including fluid operated actuator means for moving said carriage, electrohydraulic servovalve means having a closed center valve spool controlling the flow of operating fluid with respect to said actuator means and end sensing transducer means including a movable element adapted to engage the leading end of the workpiece and be moved thereby and arranged to generate a variable electrical control signal for the servovalve having a magnitude proportional to displacement of said movable element, means for moving said cut-off element from its said inoperative position to its said operative position after it has attained said same speed and positional synchronization thereby to cut off a predetermined length of the workpiece from the parent portion thereof, means arranged thereafter to feed an increased electrical signal input to the servovalve thereby to accelerate said cut-off element away from the leading end of said parent portion of the workpiece and also arranged to return said cut-off element to its said inoperative position, and means arranged thereafter to reverse the direction of motion of said carriage.

5. In apparatus for cutting off predetermined lengths of a workpiece while moving, the combination comprising a carriage reciprocably movable in parallelism to the workpiece, cut-off means on said carriage and including a cut-off element movable from an inoperative position in which it is disengaged from the workpiece to an operative position in which it engages the workpiece, means for accelerating said carriage from a starting position to move said cut-off element in the same direction and at the same speed as the workpiece in predetermined positional synchronization therewith including fluid operated actuator means for moving said carriage, electrohydraulic servovalve means having a closed center valve spool controlling the flow of operating fluid with respect to said actuator means and end sensing transducer means including a movable element adapted to engage the leading end of the workpiece and be moved thereby and arranged to generate a variable electrical control signal for the servovalve having a magnitude proportional to displacement of said movable element, means for moving said cut-off element from its said inoperative position to its said operative position after it has attained said same speed and positional synchronization including a first switch engaged by said carriage after the latter has moved a predetermined distance away from said starting position thereby to cut off a predetermined length of the workpiece from the parent portion thereof, means arranged thereafter to accelerate said cut-off element away from the leading end of said parent portion of the workpiece and also arranged to return said cut-off element to its said inoperative position including a second switch operatively associated with acceleration control means and also operatively associated with said cut-off means, and means operative upon return of said cut-off element to its said inoperative position for returning said carriage to its said starting position including a third switch operatively associated with return control means.

6. In apparatus for cutting off predetermined lengths of a workpiece while moving, the combination comprising a carriage reciprocably movable in parallelism to the workpiece, cut-off means on said carriage and including a cut-off element movable from an inoperative position in which it is disengaged from the workpiece to an operative position in which it engages the workpiece, means for accelerating said carriage from a starting position of rest to move said cut-off element in the same direction and at the same speed as the workpiece in predetermined positional synchronization therewith including fluid operated actuator means for moving said carriage, electrohydraulic servovalve means having a closed center valve spool controlling the flow of operating fluid with respect to said actuator means and end sensing transducer means including a movable element adapted to engage the leading end of the workpiece and be moved thereby and arranged to generate a variable electrical control signal for the servovalve having a magnitude proportional to displacement of said movable element, means for moving said cut-off element from its said inoperative position to its said operative position after it has attained said same speed and positional synchronization thereby to cut off a predetermined length of the workpiece from the parent portion thereof, means arranged thereafter to feed an increased electrical signal to the servovalve thereby to accelerate said cut-off element away from the leading end of said parent portion of the workpiece and also arranged to return said cut-off element to its said inoperative position, means arranged thereafter to reverse the polarity of the electrical control signal for the servovalve thereby to return said carriage toward its said starting position, and means for reducing the magnitude of the last-mentioned electrical control signal during the terminal portion of the return travel of said carriage thereby to decelerate its return to its said starting position.

7. In apparatus for cutting off predetermined lengths of a workpiece while moving, the combination comprising a carriage reciprocably movable in parallelism to the workpiece, cut-off means on said carriage and including a cut-off element movable from an inoperative position in which it is disengaged from the workpiece to an operative position in which it engages the workpiece, means for accelerating said carriage from a starting position of rest to move said cut-off element in the same direction and at the same speed as the workpiece in predetermined positional synchronization therewith including fluid operated actuator means for moving said carriage, electrohydraulic servovalve means having a closed center valve spool controlling the flow of operating fluid with respect to said actuator means and end sensing transducer means including a movable element adapted to engage the leading end of the workpiece and be moved thereby and arranged to generate a variable electrical control signal for the servovalve having a magnitude proportional to displacement of said movable element, means for moving said cut-off element from its said inoperative position to its said operative position after it has attained said same speed and positional synchronization including a first switch engaged by said carriage after the latter has moved a predetermined distance away from its said starting position thereby to cut off a predetermined length of the workpiece from the parent portion thereof, means arranged thereafter to accelerate said cut-off element away from the leading end of said parent portion of the workpiece and also arranged to return said cut-off element to its said inoperative position including a second switch operatively associated with acceleration control means and also operatively associated with said cut-off means, means operative upon return of said cut-off element to its said inoperative position for returning said carriage toward its said starting position including a third switch operatively associated with return speed control means arranged to reverse the polarity of the electrical control signal for the servovalve, and means for decelerating return of said carriage to its said starting position during the terminal portion of its return travel including a fourth switch operatively associated with said carriage and also operatively associated with return deceleration control means and arranged to reduce the magnitude of the last-mentioned electrical control signal.

8. In apparatus for cutting off predetermined lengths of a workpiece while moving, the combination comprising a carriage reciprocably movable in parallelism to the workpiece, cut-off means on said carriage and including a cut-off element movable from an inoperative position in which it is disengaged from the workpiece to an operative position in which it engages the workpiece, means for accelerating said carriage from a starting position of rest to move said cut-off element in the same direction and at the same speed as the workpiece in predetermined positional synchronization therewith including fluid operated actuator means for moving said carriage, electrohydraulic servovalve means having a closed center valve spool controlling the flow of operating fluid with respect to said actuator means and end sensing transducer means including a movable element adapted to engage the leading end of the workpiece and be moved thereby and arranged to generate a variable electrical control signal for the servovalve having a magnitude proportional to displacement of said movable element, means for moving said cut-off element from its said inoperative position to its said operative position after it has attained said same speed and positional synchronization including a first switch engaged by said carriage after the latter has moved a predetermined distance away from its said starting position thereby to cut off a predetermined length of the workpiece from the parent portion thereof, means arranged thereafter to accelerate said cut-off element away from the leading end of said parent portion of the workpiece and also arranged to return said cut-off element to its said inoperative position including a second switch operatively associated with acceleration control means and also operatively associated with said cut-off means, means operative upon return of said cut-off element to its said inoperative position for returning said carriage toward its said starting position including a third switch operatively associated with return speed control means arranged to reverse the polarity of the electrical control signal for the servovalve, means for decelerating return of said carriage to its said starting position during the terminal portion of its return travel including a fourth switch operatively associated with said carriage and also operatively associated with return deceleration control means arranged to reduce the magnitude of the last-mentioned electrical control signal, and reset switch means including an element engaged by said carriage upon return to its said starting position and operatively associated with said acceleration control means, return speed control means and return deceleration control means.

9. In apparatus for cutting off a predetermined length of a workpiece while moving, the combination comprising a carriage movable in the same direction as the workpiece, cut-off means on said carriage and arranged to sever the workpiece, and means arranged to accelerate said carriage to the same speed as the workpiece in predetermined positional synchronization therewith including fluid operated actuator means for moving said carriage, electrohydraulic servovalve means having an electrical force motor and a closed center valve spool controlling the flow of operating fluid with respect to said actuator means, end sensing transducer means including a movable element adapted to engage the leading end of the workpiece and be moved thereby and arranged to generate an electrical signal having a magnitude proportional to displacement of said movable element and circuit means operatively associated with said transducer means and motor and including gain adjustment means to produce an output electrical signal in proportion to the input electrical signal received from said transducer means and also including means for feeding a second electrical signal into said gain adjustment means for changing the level of magnitude of said output signal resulting in effective adjustment of the set position of said movable element of said transducer means and thereby achieve adjustment of the length of the cut-off portion of the workpiece.

10. In apparatus for cutting off a predetermined length of a workpiece while moving, the combination comprising a carriage movable in the same direction as the workpiece, cut-off means on said carriage and arranged to sever the workpiece, and means arranged to accelerate said carriage to the same speed as the workpiece in predetermined positional synchronization therewith including fluid operated actuator means for moving said carriage, electrohydraulic servovalve means having an electrical force motor and a closed center valve spool controlling the flow of operating fluid with respect to said actuator means, end sensing transducer means including a movable element adapted to engage the leading end of the workpiece and be moved thereby and arranged to generate a first electrical signal having a magnitude proportional to displacement of said movable element, circuit means operatively associated with said transducer means and motor and including signal summing means arranged to receive said first signal and means for feeding a second electrical signal into said summing means which is proportional to the speed of the moving workpiece whereby to compensate for variation in such speed.

11. In apparatus for cutting off a predetermined length of a workpiece while moving, the combination comprising means for moving the workpiece, a carriage movable in the same direction as the workpiece, cut-off means on said carriage and arranged to sever the workpiece, means arranged to accelerate said carriage to the same speed as the workpiece in a predetermined positional synchronization therewith including fluid operated actuator means for moving said carriage, electrohydraulic servovalve means having an electrical force motor and a closed center valve spool controlling the flow of operating fluid with respect to said actuator means and end sensing transducer means including a movable element adapted to engage the leading end of the workpiece and be moved thereby and arranged to generate an electrical control signal for said motor having a magnitude proportional to displacement of said movable element, time delay relay means including a switch having a starting position and actuated by movement of said element, and control means operatively associated with said relay means for deactivating the workpiece moving means, said relay means being operative to actuate said control means to deactivate the workpiece moving means if said switch does not return to its said starting position within the time set by said relay means.

12. In apparatus for working on a workpiece while moving, the combination comprising a carriage movable with respect to the workpiece, tool means on said carriage and movable with respect to the workpiece and arranged to engage the same, and means for effecting predetermined positional synchronization between said carriage and workpiece including fluid operated actuator means for moving said carriage, means for sensing the position of the workpiece relative to said carriage and arranged to provide a variable electrical control signal proportional to deviation from a predetermined relative position between said carriage and workpiece and electrohydraulic servovalve means having a proportional response characteristic controlled by said signal, said servovalve means including actuating ports constantly in direct fluid conducting communication with said actuator means and also including a closed center valve spool for controlling the flow of operating fluid through said ports.

13. In apparatus for working on a workpiece while moving, the combination comprising a carriage movable with respect to the workpiece, tool means on said carriage and movable with respect to the workpiece and arranged to engage the same, and means for effecting predetermined positional synchronization between said carriage and workpiece including fluid operated actuator means for moving said carriage, means for sensing the position of the workpiece relative to said carriage and arranged to provide a variable electrical control signal proportional to deviation from a predetermined relative position between said carriage and workpiece and electrohydraulic servovalve means having a proportional response characteristic controlled by said signal, said servovalve means including actuating ports constantly in direct fluid conducting communication with said actuator means and closely coupled thereto and also including a closed center valve spool for controlling the flow of fluid through said ports and further having a frequency response such that the 90° phase lag occurs at least at 40 cycles per second when the servovalve is supplied with operating fluid having a pressure of at least 1000 pounds per square inch and subjected to a sinusoidal electrical input signal of at least one-third rated signal.

14. In apparatus for cutting off a predetermined length of a workpiece while moving, the combination comprising a carriage movable in the same direction as the workpiece from a starting position, means arranged to accelerate said carriage from its said starting position to movement in the same direction and at the same speed as the workpiece in predetermined positional synchronization therewith including fluid operated actuator means for moving said carriage, means for sensing the position of the workpiece relative to said carriage including a movable element adapted to engage the leading end of the workpiece and be moved thereby and arranged to generate a variable electrical control signal having a magnitude proportional to displacement of said movable element and electrohydraulic servovalve means having a proportional response characteristic controlled by said signal, said servovalve means including actuating ports constantly in direct fluid conducting communication with said actuator means and also including a closed center valve spool for controlling the flow of fluid through said ports and further having a frequency response such that the 90° phase lag occurs at least at 40 cycles per second when the servovalve is supplied with operating fluid having a pressure of at least 1000 pounds per square inch and subjected to a sinusoidal electrical input signal of at least one third rated signal, and cut-off means on said carriage and arranged to sever the workpiece after said positional synchronization has been attained.

References Cited by the Examiner

UNITED STATES PATENTS

| | | | |
|---|---|---|---|
| 2,163,967 | 6/39 | Strawn | 83—292 |
| 2,262,619 | 11/41 | Morris | 83—293 |
| 2,540,166 | 2/51 | Frank | 83—292 |
| 2,678,097 | 5/54 | Hahn | 83—292 |
| 2,757,734 | 8/56 | Richardson | 83—292 |
| 3,023,782 | 3/62 | Chaves. | |
| 3,029,675 | 4/62 | Alexander | 83—76 |

ANDREW R. JUHASZ, *Primary Examiner.*

CARL W. TOMLIN, *Examiner.*